United States Patent
Mason et al.

(10) Patent No.: US 11,912,172 B2
(45) Date of Patent: Feb. 27, 2024

(54) INFANT CARRIER RELEASING STRUCTURE, INFANT CARRIER AND INFANT SAFETY SEAT

(71) Applicant: CHINA WONDERLAND NURSERYGOODS CO., LTD, Guangdong (CN)

(72) Inventors: Kyle S Mason, West Lawn, PA (US); Colin F Eggert-Crowe, Philadelphia, PA (US)

(73) Assignee: CHINA WONDERLAND NURSERYGOODS CO., LTD, Dongguan (CN)

(*) Notice: Subject to any disclaimer, the term of this patent is extended or adjusted under 35 U.S.C. 154(b) by 0 days.

(21) Appl. No.: 17/371,131

(22) Filed: Jul. 9, 2021

(65) Prior Publication Data
US 2022/0024359 A1 Jan. 27, 2022

(30) Foreign Application Priority Data
Jul. 10, 2020 (CN) .......................... 202021359183.3

(51) Int. Cl.
*B60N 2/28* (2006.01)
(52) U.S. Cl.
CPC ................. *B60N 2/2821* (2013.01)
(58) Field of Classification Search
CPC .... B60N 2/2821; B60N 2/286; B60N 2/2863; B60N 2/2842; B60N 2/2848
See application file for complete search history.

(56) References Cited

U.S. PATENT DOCUMENTS

| | | | |
|---|---|---|---|
| 6,715,828 B1 | 4/2004 | Cheng | |
| 8,882,196 B2* | 11/2014 | Williams | B60N 2/2875 297/256.16 |
| 9,592,751 B2* | 3/2017 | Kirstein | B60N 2/2821 |
| 2005/0264062 A1* | 12/2005 | Longenecker | B60N 2/2845 297/250.1 |
| 2010/0207436 A1* | 8/2010 | Karremans | B60N 2/2821 297/256.16 |
| 2011/0074194 A1* | 3/2011 | Weber | B60N 2/286 297/256.16 |
| 2011/0298259 A1 | 12/2011 | Heisey | |

(Continued)

FOREIGN PATENT DOCUMENTS

| | | |
|---|---|---|
| CN | 213442200 U | 6/2021 |
| WO | 2005/053999 A2 | 6/2005 |

*Primary Examiner* — David R Dunn
*Assistant Examiner* — Tania Abraham

(57) ABSTRACT

An infant carrier releasing structure includes a releasing piece, a linkage assembly and a locking piece, the releasing piece may be slidably disposed on an infant carrier, and the linkage assembly is set in the infant carrier, the releasing piece is connected to an end of the linkage assembly, and another end of the linkage assembly is connected to the locking piece, the locking piece is connected pivotally to the infant carrier, and configured to be engaged with the base, wherein when the releasing piece is slid, the linkage assembly is driven by a slide of the releasing piece, so that the locking piece is driven by the linkage assembly and disengaged from the base to release the infant carrier from the base. The infant carrier releasing structure of the disclosure has a simple structure, is easy to operate and low in production cost.

7 Claims, 7 Drawing Sheets

(56) References Cited

U.S. PATENT DOCUMENTS

| | | | | |
|---|---|---|---|---|
| 2012/0261961 A1* | 10/2012 | Heisey | ............... | B62B 7/142 |
| | | | | 297/256.16 |
| 2012/0326474 A1* | 12/2012 | Williams | ............ | B60N 2/2356 |
| | | | | 280/30 |
| 2013/0140864 A1 | 6/2013 | Fang et al. | | |
| 2015/0108801 A1* | 4/2015 | Hou | ............... | B60N 2/2821 |
| | | | | 297/256.16 |
| 2015/0329016 A1* | 11/2015 | Heisey | ............ | B60N 2/2821 |
| | | | | 280/47.38 |
| 2019/0263298 A1* | 8/2019 | Gay | ............... | B60N 2/2881 |

* cited by examiner

INFANT CARRIER RELEASING STRUCTURE, INFANT CARRIER AND INFANT SAFETY SEAT

CROSS-REFERENCE TO RELATED APPLICATION

This non-provisional application claims priority under 35 U.S.C. § 119(a) on Patent Application No(s). 202021359183.3 filed in China on Jul. 10, 2020, the entire contents of which are hereby incorporated by reference.

BACKGROUND OF THE INVENTION

1. Field of the Invention

The present disclosure relates to a field of infant products, and in particular to an infant carrier releasing structure of an infant safety seat.

2. Description of the Related Art

The infant safety seat, also known as the car safety seat, is a seat designed specifically for children. A child in a car is restrained by the infant safety seat disposed in the car, to ensure safety of the child during a ride. Existing infant safety seats generally include a base and a seat body, the base can be used to connect to the car seat and the seat body can be disassembled from the base. The seat body can be used alone after it was disassembled from the base, or it can be connected to the base to form an infant safety seat and installed in the car seat. Among conventional infant safety seats, the releasing mechanism used for the seat body to be disassembled from the base has a complicated structure and high production cost.

BRIEF SUMMARY OF THE INVENTION

The first objective of the disclosure is to provide an infant carrier releasing structure which has a simple structure and low production cost.

The second objective of the disclosure is to provide an infant safety seat which has an infant carrier releasing structure, and the infant carrier releasing structure has a simple structure and low production cost.

To achieve the first objective, the present disclosure provides an infant carrier releasing structure used to disassemble an infant carrier from a base. The infant carrier releasing structure includes a releasing piece, a linkage assembly and a locking piece. The releasing piece is slidably disposed on the infant carrier. The linkage assembly is at least partially in the infant carrier. The releasing piece is connected to an end of the linkage assembly, and another end of the linkage assembly is connected to the locking piece. The locking piece is connected pivotally to the infant carrier and configured to be engaged with the base. When the releasing piece is slid, the linkage assembly is driven by a slide of the releasing piece, so that the locking piece is driven by the linkage assembly and disengaged from the base to release the infant carrier from the base.

Compared to the state of the art, the infant carrier releasing structure of the disclosure drives the action of the linkage assembly, wherein when the releasing piece is slid, the linkage assembly is driven by a slide of the releasing piece and the locking piece is rotated so that the locking piece is driven by the linkage assembly and disengaged from the base to release the infant carrier from the base. The infant carrier releasing structure of the disclosure has a simple structure, is easy to operate, and has a low production cost.

In a preferable embodiment, the linkage assembly includes a first linkage and a second linkage, one end of the first linkage is connected to the releasing piece, another end of the first linkage is connected pivotally to one end of the second linkage, and another end of the second linkage is connected to the locking piece.

In a preferable embodiment, the second linkage includes a groove, and one end of the locking piece is inserted slidably into the groove.

In a preferable embodiment, the infant carrier releasing structure further includes an elastic component, and the elastic component is between the locking piece and the infant carrier.

In a preferable embodiment, the elastic component is a torsion spring.

To achieve the second objective, the present disclosure provides an infant safety seat. The infant safety seat includes a base and an infant carrier. The base is configured to be installed on a car seat. The infant carrier comprises a carrier body and the infant carrier releasing structure. The carrier body has a seat for an infant to be seated. The releasing piece is slidably disposed on the carrier body. The locking piece is connected pivotally to the carrier body. The locking piece is at a bottom of the carrier body.

Compared to the state of the art, as the infant safety seat of the disclosure has the infant carrier releasing structure, wherein when the releasing piece is slid, the linkage assembly is driven by a slide of the releasing piece and drives the locking piece to rotate so that the locking piece is driven by the linkage assembly and disengaged from the base to release the infant carrier from the base. The infant carrier releasing structure of the disclosure has a simple structure, is easy to operate, and has a low production cost.

In a preferable embodiment, the seat is on a front side of the carrier body, and the releasing piece is on a rear side of the carrier body.

In a preferable embodiment, an anti-slip strip protrudes from the bottom of the carrier body.

In a preferable embodiment, the base includes a cross bar for engaging with the locking piece.

DETAILED DESCRIPTION OF THE INVENTION

Figure 1:
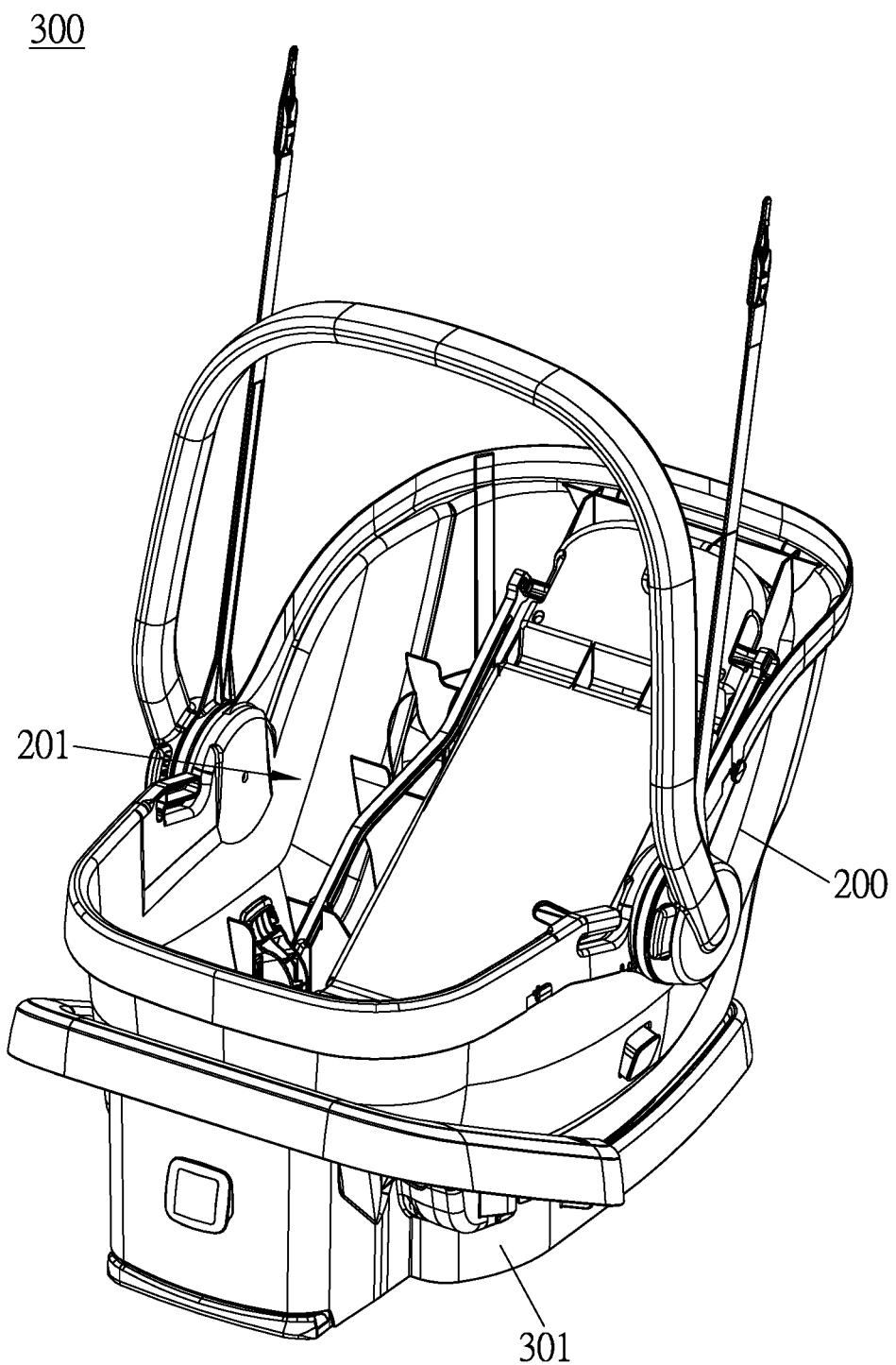
FIG. 1 is a schematic elevation of the structure of an infant safety seat of the present disclosure.
Figure 2:
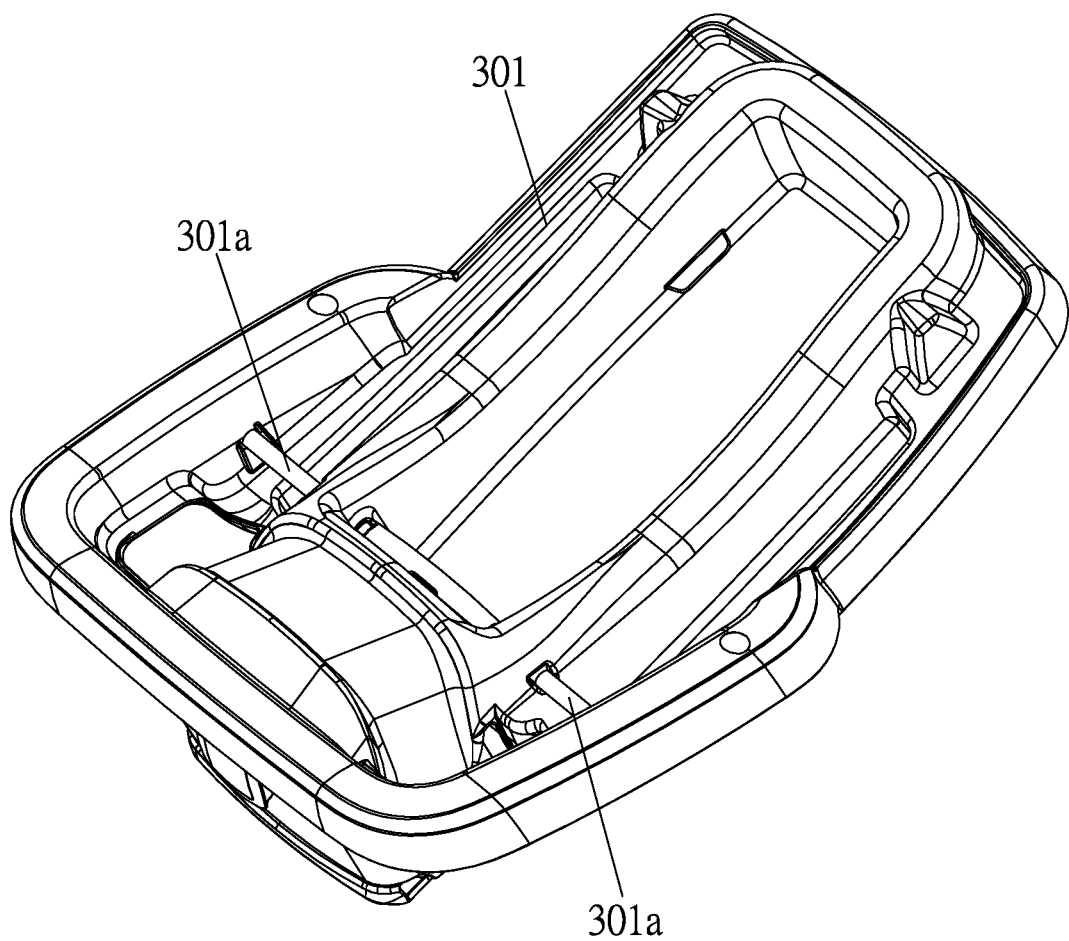
FIG. 2 is a schematic view of the structure of the base of the infant safety seat of the present disclosure.

To facilitate understanding of the technical contents, structures and characteristics of this present disclosure, embodiments together with the attached drawings for the detailed description of the present disclosure are provided.

Referring to FIGS. 1 to 6, as shown in the drawings, the disclosure provides an infant safety seat 300 comprising a base 301 connected with a car seat and an infant carrier 210. The infant carrier 210 comprises a carrier body 200 and an infant carrier releasing structure 100, and the carrier body 200 has a seat 201 for the infant to be seated. The seat 201 can be an accommodating structure, wherein soft materials can be disposed on the seat 201 for the infant to be comfortably seated therein. The infant carrier releasing structure 100 is used to disassemble the infant carrier 210 from the base 301, and the infant carrier releasing structure 100 comprises a releasing piece 1, a linkage assembly 2 and a locking piece 3, wherein the releasing piece 1 may be slidably disposed on the infant carrier 210. Specifically, the releasing piece 1 may be slidably disposed on the carrier body 200, and a user may pull the releasing piece 1 so that the releasing piece 1 is slid on the carrier body 200. The linkage assembly 2 is at least partially in the infant carrier 210. One end of the linkage assembly is connected to the releasing piece 1, and another end of the linkage assembly is connected to the locking piece 3. The locking piece 3 is connected pivotally to the infant carrier 210, the locking piece 3 is at a bottom of the infant carrier 210, and the locking piece 3 is used to engage and connect with the base 301, but the position for the locking piece 3 is not limited to herein. Specifically, the locking piece 3 is connected pivotally to the carrier body 200, the locking piece 3 is at the bottom of the carrier body 200. When the user pulls the releasing piece 1, the releasing piece 1 is slid on the carrier body 200, and the linkage assembly 2 is driven by a slide of the releasing piece 1 and can drive the locking piece 3 to rotate, so that the locking piece 3 is driven by the linkage assembly 2 and disengaged from the base 301, thus the infant carrier 210 releases locking relative to the base 301. More specifically, the base 301 includes a cross bar 301a for engaging the locking piece 3. When the locking piece 3 is engaged with the cross bar 301a, the carrier body 200 is locked on the base 301; when the locking piece 3 is disengaged from the cross bar 301a, the carrier body 200 is released from the base 301, and thus the infant carrier 210 is disassembled from the base 301. In the embodiment, the infant carrier 210 is a basket, but is not limited herein. For example, the infant carrier 210 may also be an infant seat.

Figure 6:
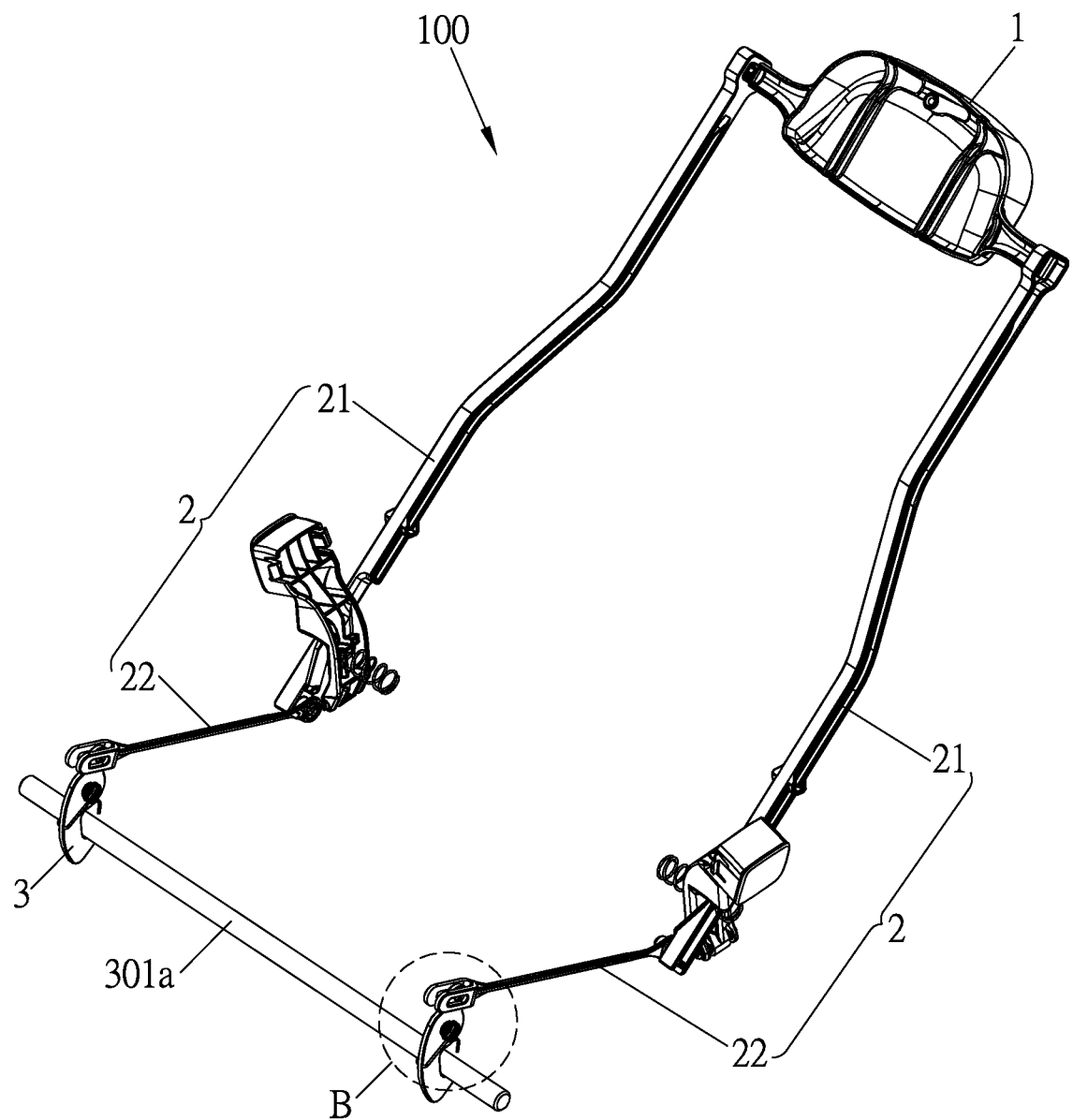
FIG. 6 is a schematic view of the structure of an infant carrier releasing structure of the present disclosure.
Figure 7:
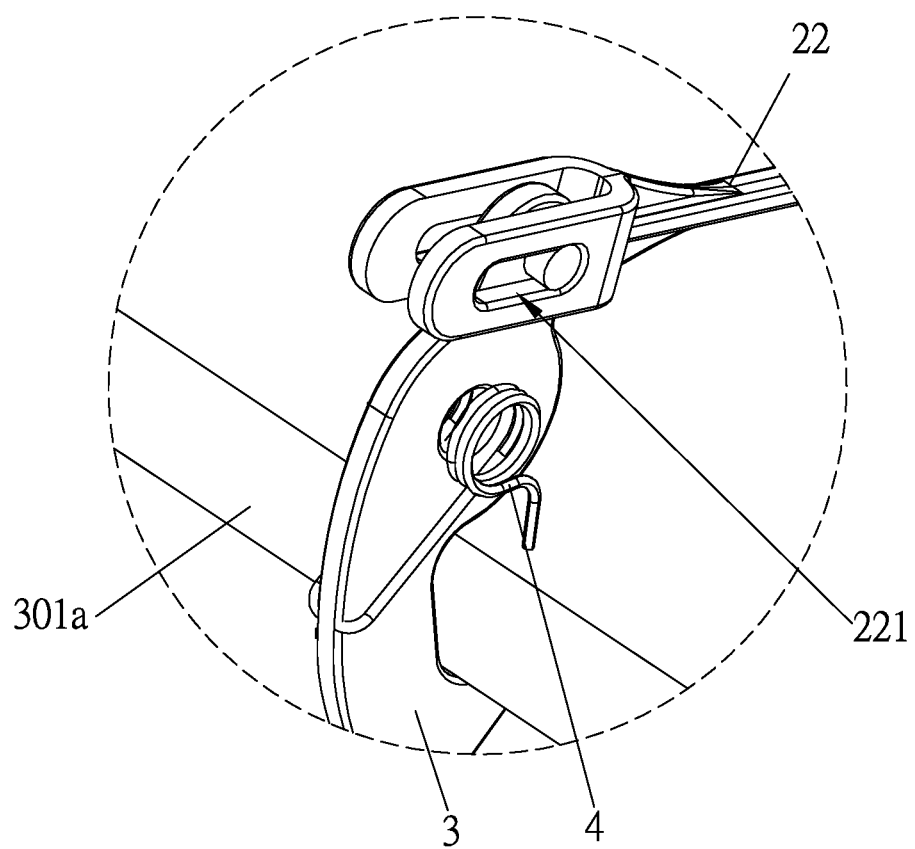
FIG. 7 is an enlarged view at position B of FIG. 6.

Referring to FIGS. 6 and 7, as shown in the drawings, the linkage assembly 2 comprises a first linkage 21 and a second linkage 22. One end of the first linkage 21 is connected to the releasing piece 1, and another end of the first linkage 21 is connected pivotally to one end of the second linkage 22. Another end of the second linkage 22 is connected to the locking piece 3. The sliding of the releasing piece 1 pulls the first linkage 21, the first linkage 21 drives the action of the second linkage 22 to make the second linkage 22 pull the locking piece 3 to rotate so that the locking piece 3 is driven by the linkage assembly 2 and disengaged from the base 301, and thus the infant carrier 210 is released relative to the base 301. Specifically, the second linkage 22 includes a groove 221, and one end of the locking piece 3 may be inserted slidably into the groove 221, wherein the locking piece 3 is inserted into the groove 221 by a pin.

Referring to FIG. 7, as shown in the drawing, the infant carrier releasing structure 100 further comprises an elastic component 4, and the elastic component 4 is between the locking piece 3 and the infant carrier 210. When the locking piece 3 is rotated to disengage from the base 301, the locking piece 3 compresses the elastic component 4; when the releasing piece 1 is released, the locking piece 3 may be rotated to return to its' previous position under the elastic force of the elastic component 4. Thus, the locking piece 3 is re-engaged with the cross bar 301a of the base 301, and re-locking the infant carrier 210 on the base 301. In the embodiment, the elastic component 4 is a torsion spring, but not limited to herein.

Figure 3:
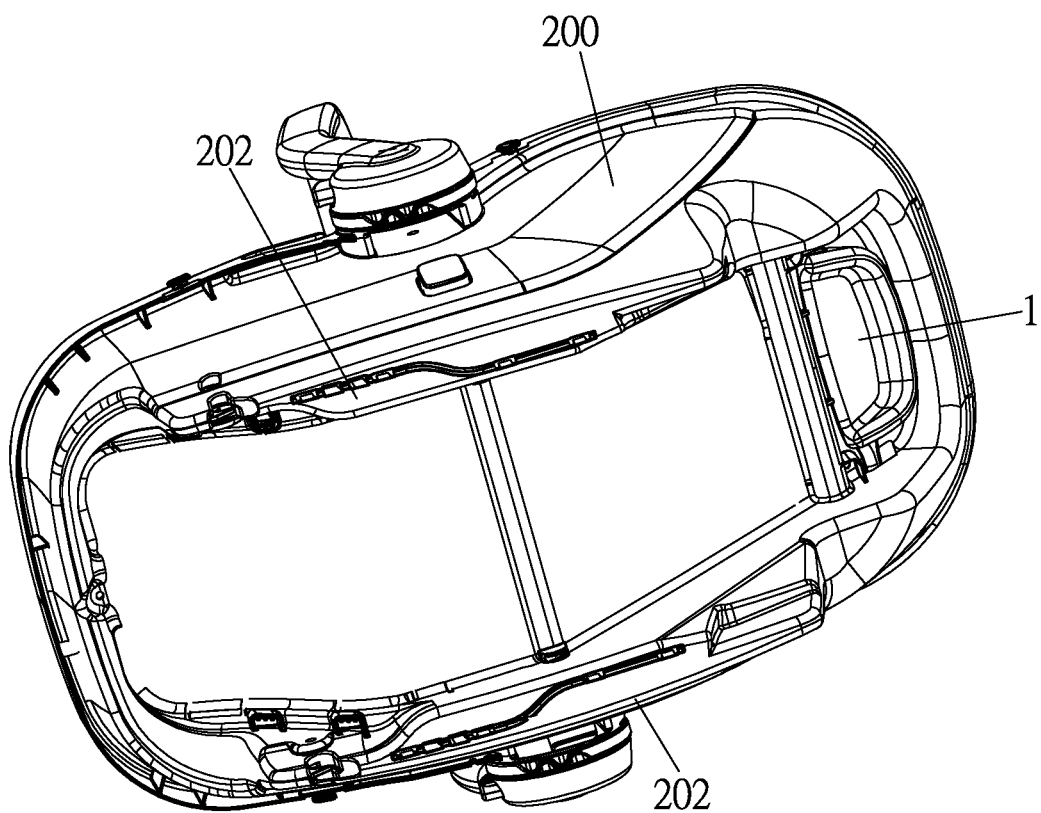
FIG. 3 is a schematic view of the structure of an infant carrier of the present disclosure.
Figure 4:
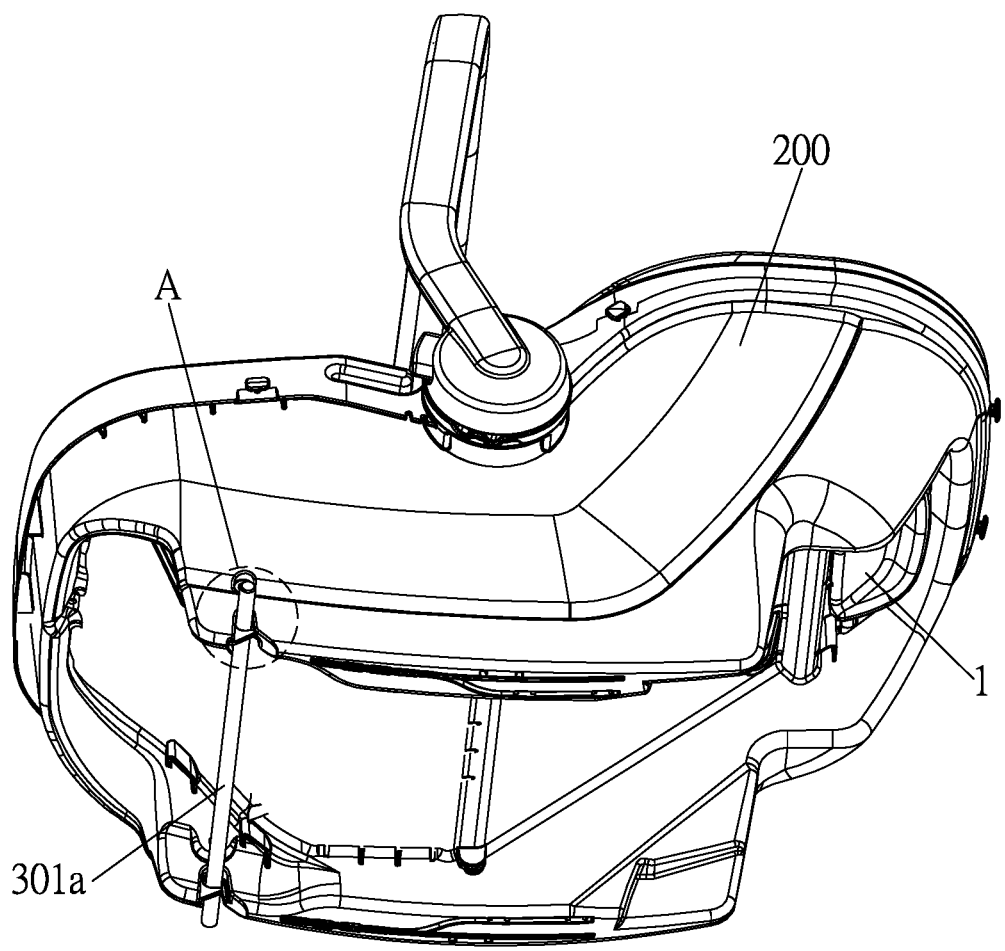
FIG. 4 is a schematic view of the structure of the infant carrier connecting with a cross bar of the present disclosure.
Figure 5:
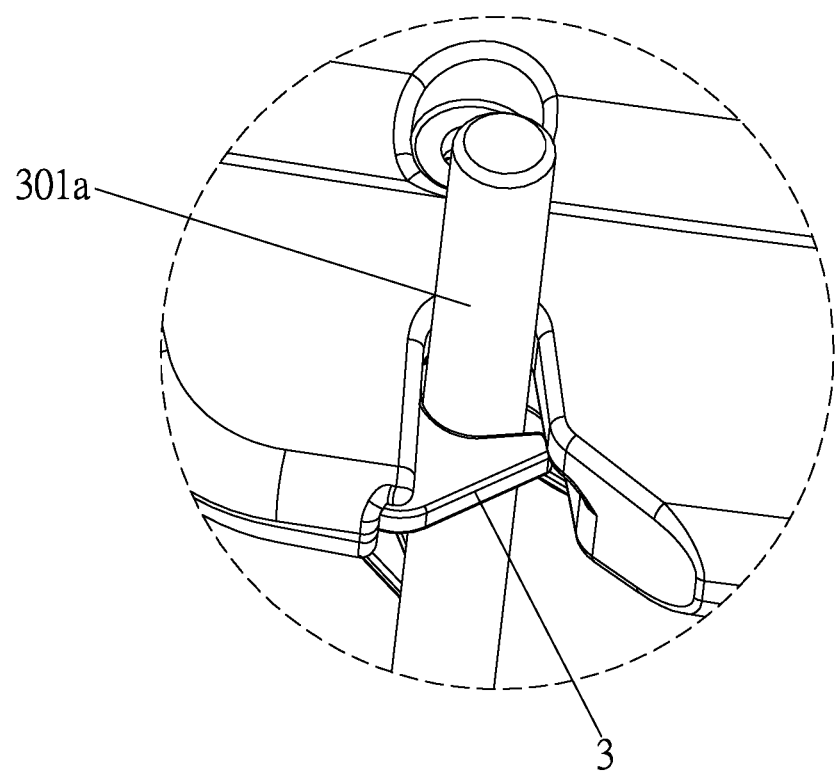
FIG. 5 is an enlarged view at position A of FIG. 4.

Referring to FIGS. 1 and 3, as shown in the drawings, the seat 201 is on a front side of the carrier body 200, and the releasing piece 1 is on a rear side of the carrier body 200 thus it is convenient for a user to operate the releasing piece 1.

Referring to FIG. 3, as shown in the drawing, an anti-slip strip 202 is protruded from the carrier body 200 and is on the bottom of the carrier body 200. The anti-slip strip 202 can be located next to the locking piece 3. When the infant carrier 210 is disassembled from the base 301 and used alone, the anti-slip strip 202 can provide an anti-slip effect for the infant carrier 210. When the infant carrier 210 is placed on a flat surface and the bottom of the carrier body 200 contacts the flat surface, the anti-slip strip 202 can prevent the infant carrier 210 from sliding on the flat surface.

Combined with FIGS. 1 to 7, the principle of the infant carrier releasing structure 100 is as follows: the releasing piece 1 is operated by the user to slide in the carrier body 200, so as to pull the first linkage 21. A movement of the first linkage 21 can pull the second linkage 22, thus the second linkage 22 is rotated. A rotation of the second linkage 22 can pull the locking piece 3, thus the locking piece 3 is rotated, so that the locking piece 3 is disengaged from the cross bar 301a. When the locking piece 3 is disengaged from the cross bar 301a, the locking piece 3 compresses the elastic return piece 4. When the releasing piece 1 is released, the locking piece 3 can be rotated to return to its's previous position, under the elastic force of the elastic component 4. When the locking piece 3 is returned to its' previous position, the second linkage 22, the first linkage 21, and the releasing piece 1 are also driven by the locking piece 3 to return to their previous position.

In summary, the infant safety seat 300 of the present disclosure has the infant carrier releasing structure 100, wherein the releasing piece 1 is slid, the linkage assembly 2 is driven by a slide of the releasing piece 1 and drives the locking piece 3 to rotate, so that the locking piece 3 is driven by the linkage assembly 2 and disengaged from the base 301, thus the infant carrier 210 is released from the base 301, and the infant carrier 210 can be disassembled from the base 301. The infant carrier releasing structure 100 of the disclosure has a simple structure, is easy to operate, and has low production cost.

The above only discloses preferred embodiments of the disclosure, the scope of the disclosure cannot be limited by the foregoing description, so all changes which come within the meaning and range of the equivalency according to the claims of the disclosure are therefore intended to be embraced therein.

What is claimed is:

1. An infant carrier releasing structure for disassembling an infant carrier from a base, comprising: a releasing piece, a linkage assembly, and a locking piece, the releasing piece is slidably disposed on the infant carrier, the linkage assembly is at least partially in the infant carrier and comprises a first linkage and a second linkage, one end of the first linkage is connected to the releasing piece, another end of the first linkage is connected pivotally to one end of the second linkage, another end of the second linkage is connected to the locking piece, the second linkage comprises a groove, the locking piece is connected pivotally to the infant carrier and configured to be engaged with the base, and one end of the locking piece is slidably inserted into the groove, wherein when the releasing piece is slid, the linkage assembly is driven by a slide of the releasing piece, so that the locking piece is driven by the linkage assembly and disengaged from the base to release the infant carrier from the base.

2. The infant carrier releasing structure according to claim 1, wherein the infant carrier releasing structure further comprises an elastic component, and the elastic component is between the locking piece and the infant carrier.

3. The infant carrier releasing structure according to claim 2, wherein the elastic component is a torsion spring.

4. An infant safety seat, comprising: a base and an infant carrier, the base is configured to be installed on a car seat, the infant carrier comprises a carrier body and the infant carrier releasing structure of claim 1, wherein the carrier body has a seat for an infant to be seated, the releasing piece is slidably disposed on the carrier body, the locking piece is connected pivotally to the carrier body, and the locking piece is at a bottom of the carrier body.

5. The infant safety seat according to claim 4, wherein the seat is on a front side of the carrier body, and the releasing piece is on a rear side of the carrier body.

6. The infant safety seat according to claim 4, wherein an anti-slip strip protrudes from the bottom of the carrier body.

7. The infant safety seat according to claim 4, wherein the base comprises a cross bar for engaging with the locking piece.

* * * * *